US012687859B2

(12) United States Patent
Akatsuka

(10) Patent No.: US 12,687,859 B2
(45) Date of Patent: Jul. 21, 2026

(54) MOBILE OBJECT CONTROL SYSTEM

(71) Applicant: TOYOTA JIDOSHA KABUSHIKI KAISHA, Toyota (JP)

(72) Inventor: Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/932,625

(22) Filed: Oct. 31, 2024

(65) Prior Publication Data

US 2025/0258502 A1 Aug. 14, 2025

(30) Foreign Application Priority Data

Feb. 8, 2024 (JP) ................................. 2024-018125

(51) Int. Cl.
| | |
|---|---|
| *B60K 35/80* | (2024.01) |
| *B60W 50/00* | (2006.01) |
| *B60W 60/00* | (2020.01) |
| *B62D 1/00* | (2006.01) |
| *B62D 15/02* | (2006.01) |
| *G05D 1/227* | (2024.01) |
| *G05D 1/65* | (2024.01) |
| *G05D 105/22* | (2024.01) |
| *G05D 109/10* | (2024.01) |

(52) U.S. Cl.
CPC ............. *G05D 1/65* (2024.01); *G05D 1/2279* (2024.01); *G05D 2105/22* (2024.01); *G05D 2109/135* (2024.01)

(58) Field of Classification Search
CPC .... G05D 1/65; G05D 1/2279; G05D 2105/22; G05D 2109/135; B60W 2050/0064; B60W 60/00; B60W 60/00253; B62D 1/00; B62D 15/025; B60K 35/80
See application file for complete search history.

(56) References Cited

U.S. PATENT DOCUMENTS

| | | | |
|---|---|---|---|
| 11,215,982 B2 | 1/2022 | Urano et al. | |
| 11,325,618 B2 | 5/2022 | Umeda | |
| 12,508,715 B1* | 12/2025 | Abrams | ............... B25J 11/0005 |
| 2019/0137999 A1 | 5/2019 | Taguchi et al. | |
| 2019/0262992 A1* | 8/2019 | Kim | ..................... G05D 1/0234 |

(Continued)

FOREIGN PATENT DOCUMENTS

| | | |
|---|---|---|
| JP | 2019-077528 A | 5/2019 |
| JP | 2021-026558 A | 2/2021 |

*Primary Examiner* — Adam R Mott
*Assistant Examiner* — Heather J Keniry
(74) *Attorney, Agent, or Firm* — SoraIP, Inc.

(57) ABSTRACT

The processor of the mobile object control system calculates the target speed of the mobile object on the basis of the first operation amount for each individual operation terminal, calculates the target turning angular speed of the mobile object on the basis of the second operation amount for each individual operation terminal, combines the target speed calculated for each individual operation terminal at the first ratio to calculate the final target speed, combines the target turning angular speed calculated for each individual operation terminal at a second ratio different from the first ratio to calculate the final target turning angular speed, and controls one or a plurality of actuators related to the traveling of the mobile object on the basis of the final target speed and the final target turning angular speed.

8 Claims, 6 Drawing Sheets

(56)     References Cited

U.S. PATENT DOCUMENTS

| | | |
|---|---|---|
| 2020/0209888 A1 | 7/2020 | Sakai et al. |
| 2020/0326702 A1 | 10/2020 | Iwamoto et al. |
| 2021/0039680 A1 | 2/2021 | Kindo et al. |
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |

* cited by examiner

FIG. 1

| FIRST RATIO FOR THE FINAL TARGET SPEED V | | SECOND RATIO FOR THE FINAL TARGET TURNING ANGULAR VELOCITY ω | |
|---|---|---|---|
| $C_1$ | $C_2$ | $D_1$ | $D_2$ |
| 1 | 0 | 0.5 | 0.5 |

MOBILE OBJECT CONTROL SYSTEM

CROSS-REFERENCE TO RELATED APPLICATION

This application claims priority to Japanese Patent Application No. 2024-018125 filed on Feb. 8, 2024, incorporated herein by reference in its entirety.

BACKGROUND

1. Technical Field

The present disclosure relates to a technology for controlling traveling of a mobile object using a plurality of operation terminals operated by a plurality of operators.

2. Description of Related Art

Japanese Unexamined Patent Application Publication No. 2019-077528 (JP 2019-077528 A) discloses a technology for remotely operating an industrial vehicle using a remote operation device that is an operation terminal having a communication function. More specifically, JP 2019-077528 A discloses only an example of remote operation using one operation terminal.

Japanese Unexamined Patent Application Publication No. 2021-026558 (JP 2021-026558 A) discloses a driving takeover control device capable of suppressing interference between a driving operation of a first driver and a driving operation of a second driver.

SUMMARY

A configuration is conceivable in which traveling of a mobile object is controlled by cooperation between a plurality of operators who operates a plurality of operation terminals, respectively. This configuration is desirably devised to facilitate sharing of pleasure of operating the mobile object in cooperation among a plurality of operators.

The present disclosure has been made in view of the above issue, and an object of the present disclosure is to provide a mobile object control system capable of facilitating sharing of pleasure of operating a mobile object in cooperation among a plurality of operators.

A mobile object control system according to a first aspect of the present disclosure is configured to control traveling of a mobile object based on operation amount information of a plurality of operation terminals operated by a plurality of operators, respectively. The mobile object control system includes one or more processors.

The operation amount information includes a first operation amount and a second operation amount as operation amounts of each of the operation terminals.

The one or more processors are configured to:
calculate, for the individual operation terminals, target speeds that are target values of a speed in a traveling direction of the mobile object based on the first operation amount;
calculate, for the individual operation terminals, target turning angular velocities that are target values of a turning angular velocity of the mobile object based on the second operation amount;
calculate a final target speed by combining the target speeds calculated for the individual operation terminals at a first ratio;

calculate a final target turning angular velocity by combining the target turning angular velocities calculated for the individual operation terminals at a second ratio different from the first ratio; and
control one or more actuators related to the traveling of the mobile object based on the final target speed and the final target turning angular velocity.

A mobile object control system according to a second aspect of the present disclosure is configured to control traveling of a mobile object based on operation amount information of a plurality of operation terminals operated by a plurality of operators, respectively. The mobile object control system includes one or more processors.

The operation amount information includes a first operation amount and a second operation amount as operation amounts of each of the operation terminals.

The one or more processors are configured to:
calculate a first combined operation amount by combining the first operation amounts of the individual operation terminals at a first ratio;
calculate a second combined operation amount by combining the second operation amounts of the individual operation terminals at a second ratio different from the first ratio; calculate a final target speed that is a target value of a speed in a traveling direction of the mobile object based on the first combined operation amount;
calculate a final target turning angular velocity that is a target value of a turning angular velocity of the mobile object based on the second combined operation amount; and control one or more actuators related to the traveling of the mobile object based on the final target speed and the final target turning angular velocity.

According to the first and second aspects of the present disclosure, the different first and second ratios are used in the calculation of the final target speed and the final target turning angular velocity that are two target values for the traveling control on the mobile object. As a result, the ratios that reflect the first and second operation amounts of the individual operation terminals are different between the final target speed and the final target turning angular velocity. Thus, different roles are given to the individual operators in units of control amounts of the mobile object, that is, the speed and the turning angular velocity. This leads to easy sharing of the pleasure of operating the mobile object in cooperation among the operators.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a configuration example of a mobile object control system according to an embodiment;

DETAILED DESCRIPTION OF EMBODIMENTS

Figure 2A:
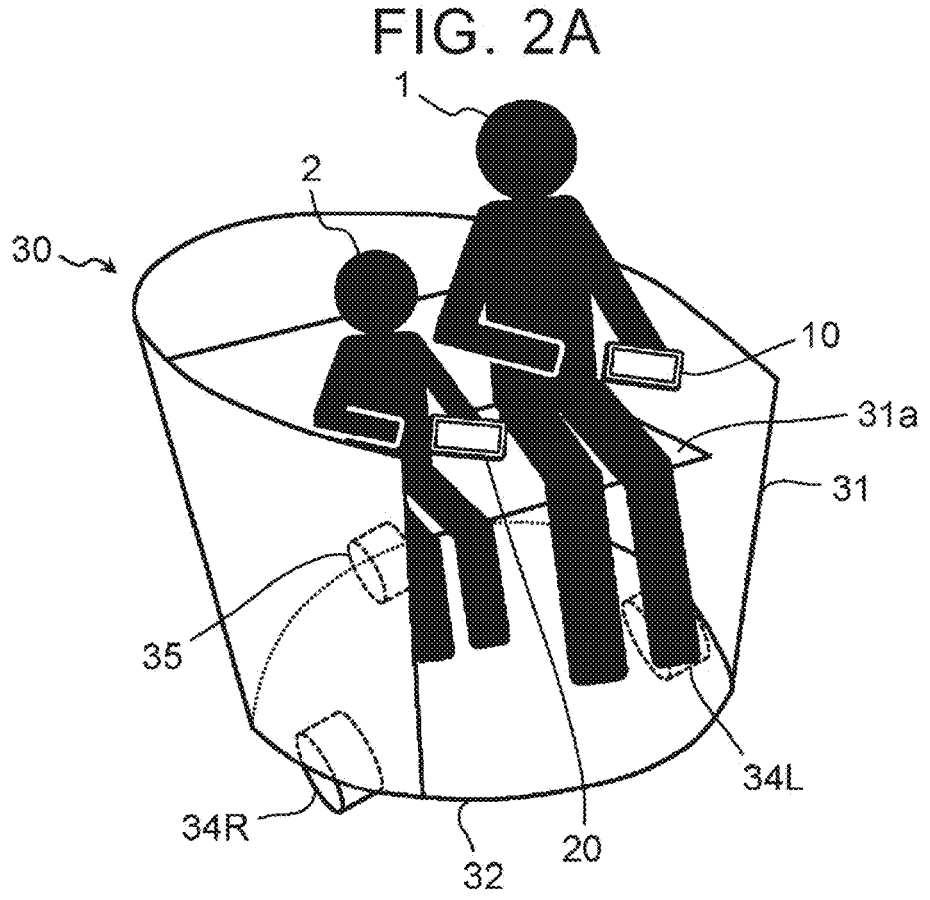
FIG. 2A is a schematic diagram illustrating a specific example of a configuration of the mobile object shown in FIG. 1.

Embodiments of the present disclosure will be described with reference to the accompanying drawings. In the drawings, the same reference numerals are assigned to the same elements, and redundant descriptions are omitted or simplified.

1. Mobile Object Control System

Figure 1:
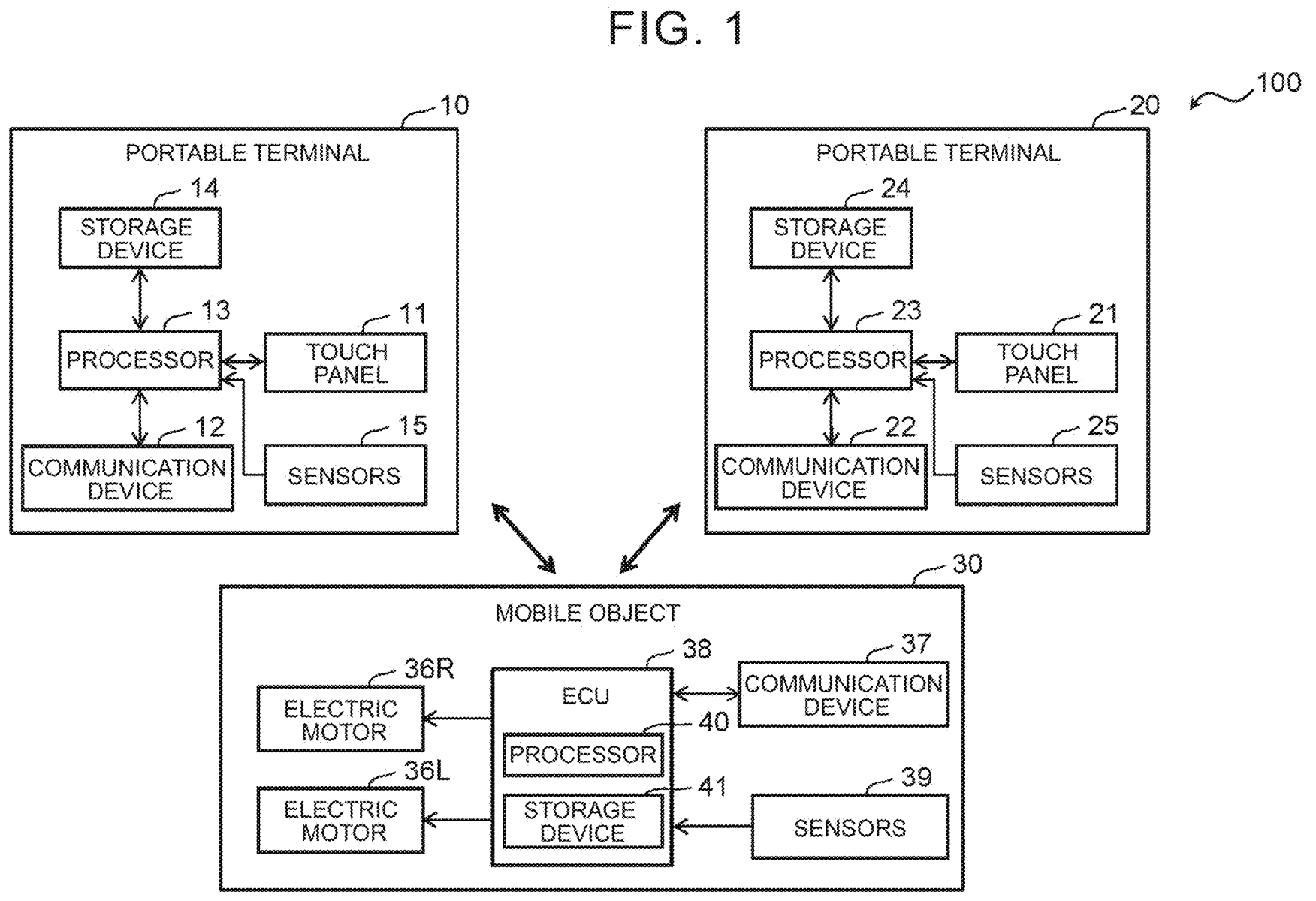

FIG. 1 is a block diagram illustrating a configuration example of a mobile object control system 100 according to an embodiment. The mobile object control system 100 includes two operation terminals (or simply terminals) 10 and 20 and a mobile object (mobility) 30. Note that the number of the "plurality of mobile terminals" included in the "mobile object control system" according to the present disclosure may be three or more.

Each of the terminals 10 and 20 is operated by two operators 1 and 2 (see FIGS. 2A and 2B) for driving (running control) the mobile object 30. For example, each of the terminals 10 and 20 is a mobile terminal such as a smartphone or a tablet terminal.

Specifically, the terminal 10 includes, for example, a touch panel 11, a communication device 12, a processor 13, a storage device 14, and sensors 15. The touch panel 11 is formed on one plate surface of the first terminal 10 and includes a display screen and a touch sensor. The touch sensor is configured to be able to detect a touch of an operator on a display screen. The communication device 12 performs wireless communication with the mobile object 30. Although the shape of the terminal 10 is not particularly limited, for example, the terminal 10 is formed in a plate shape (for example, a rectangular plate shape) in which one side is a short side direction and the other side is a longitudinal direction (see FIG. 3).

The processor (processing circuit) 13 executes various processes for controlling the travel of the mobile object 30. The storage device 14 stores various kinds of information necessary for processing by the processor 13. More specifically, the processor 13 executes various processes by using various programs related to travel control of the mobile object 30. The various programs may be stored in the storage device 14 or may be recorded in a computer-readable recording medium. The sensors 15 include, for example, an inclination angle sensor and a position sensor. The inclination angle sensor detects an inclination direction and an inclination angle (posture) of the first terminal 10. The inclination angle sensor includes, for example, a six-axis gyro sensor. The tilt angle of the terminal 10 is used for the travel control of the mobile object 30 using the "tilt operation O" described later. The position sensor includes a GNSS (Global Navigation Satellite System) receiver and detects a position and an orientation of the first terminal 10.

Like the terminal 10, the terminal 20 includes a touch panel 21, a communication device 22, a processor 23, a storage device 24, and sensors 25.

Figure 2B:
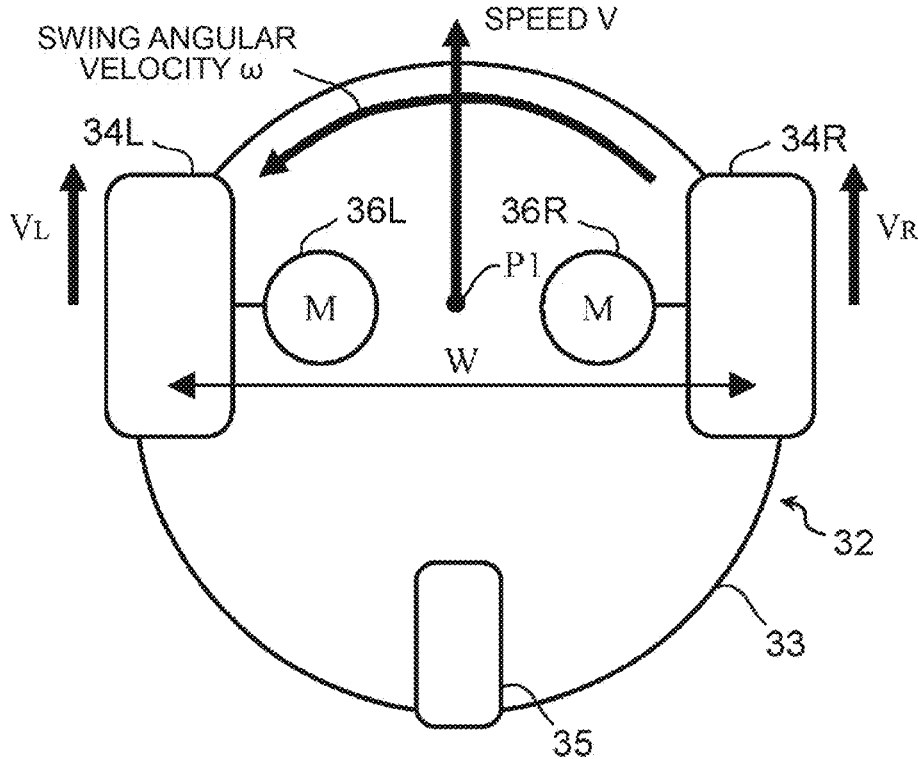
FIG. 2B is a schematic diagram illustrating a specific configuration of the mobile object shown in FIG. 1.

FIGS. 2A and 2B are schematic diagrams illustrating a specific exemplary configuration of the mobile object 30 illustrated in FIG. 1. FIG. 2A is a perspective view of a mobile object 30, and FIG. 2B is a view of the mobile object 30 looking down on a chassis 32 from above.

The mobile object 30 is an open type small mobility capable of being ridden by two persons. The mobile object 30 includes a vehicle body 31 and a chassis 32. The vehicle body 31 has a seating 31a for two passengers. As shown in FIG. 2A, one of the passengers is the operator 1 holding the terminal 10, and the other of the passengers is the operator 2 holding the terminal 20.

The chassis 32 includes a circular frame 33. Two drive wheels (left and right front wheels) 34R, a 34L, and one driven wheel (rear wheel) 35 are attached to the frame 33. The drive wheels 34R and 34L are arranged opposite each other and are respectively rotationally driven by the electric motors 36R and 36L. The driven wheel 35 is an omni-wheel (for example, an omni-wheel (registered trademark)).

The mobile object 30 further includes a communication device 37, an electronic control unit (ECU) 38, and sensors 39. The communication device 37 performs wireless communication with the first and second terminals 10 and 20.

ECU 38 controls the traveling of the mobile object 30. ECU 38 includes a processor 40 and a storage device 41. The processor 40 executes various processes related to travel control of the mobile object 30. The storage device 41 stores various kinds of information necessary for processing by the processor 40. More specifically, the processor 40 executes various processes using various programs related to travel control of the mobile object 30. The various programs may be stored in the storage device 41 or may be recorded in a computer-readable recording medium.

The sensors 39 include, for example, a recognition sensor, a moving object state sensor, and a position sensor. The recognition sensor recognizes a situation around the mobile object 30. Examples of recognition sensors include cameras, LIDAR (Laser Imaging Detection and Ranging), radars, and the like. The mobile object state sensor detects a state of the mobile object 30. The moving body state sensor includes, for example, a speed sensor that detects the speed V and a turning angular speed sensor that detects the turning angular speed $\omega$. The position sensor detects the position and the azimuth of the mobile object 30. For example, the position sensor includes a GNSS receiver.

As shown in FIG. 2B, the speed V is a speed in the traveling direction of the mobile object 30, and more specifically, is a speed in the center position P1 of the two drive wheels 34R and 34L. The velocities $V_R$ and $V_L$ are the velocities at the grounding points of the drive wheels 34R and 34L, respectively. Assuming that the distance between the drive wheel 34R and the drive wheel 34L is W and the turning angular velocity $\omega$ at the time of the left turning is positive, the velocities $V_R$ and $V_L$ can be expressed by the following Equations (1) and (2) using the speed V, the turning angular velocity @, and the distance W, respectively.

$$V_L = V - \omega \times W/2 \tag{1}$$

$$V_R = V + \omega \times W/2 \tag{2}$$

As can be seen from the relations of equations (1) and (2), ECU 38 can cause the mobile object 30 to travel straight along the traveling direction by controlling the two electric motors 36R and 36L such that the velocity $V_R$ and the velocity $V_L$ are equal. ECU 38 can then accelerate and decelerate the mobile object 30 by controlling the two electric motors 36R and 36L. In addition, ECU 38 can turn the mobile object 30 to the left and right by controlling the two electric motors 36R and 36L to provide a difference between the velocity $V_R$ and the velocity $V_L$.

In addition, the "plurality of operation terminals" according to the present disclosure is not limited to a portable terminal such as a smartphone, and may be a terminal using another operation method such as a joystick. In addition, the "mobile object" according to the present disclosure is not limited to the mobile object 30 shown in FIG. 2A, and may be various moving bodies such as a four-wheeled vehicle. In the example of the mobile object 30, the operators 1 and 2 ride on the mobile object 30 and operate the terminals 10 and 20. However, in an example in which a plurality of operation terminals capable of wirelessly communicating with a mobile object are used, the "plurality of operators" according to the present disclosure may remotely operate the mobile object from outside the mobile object. In the example of the mobile object operated by the plurality of operators on board, the plurality of operation terminals may be wired to the mobile object.

2. Travel Control of Mobile Object

The mobile object control system 100 is configured to control the traveling of the mobile object 30 based on the operation amount information I of the plurality of operation terminals (terminals 10 and 20). More specifically, the mobile object control system 100 controls the speed V and the turning angular speed ω of the mobile object 30 based on the operation amount information I. That is, the speed V and the turning angular velocity ω correspond to a control amount for controlling the travel of the mobile object 30.

The mobile object control system 100 uses the operation amount information I when the tilt operation O of each of the terminals 10 and 20 is performed in order to control each of the speed V and the turning angular velocity ω. The tilt operation O is an operation of tilting the terminals 10 and 20 by the operators 1 and 2.

Figure 3:
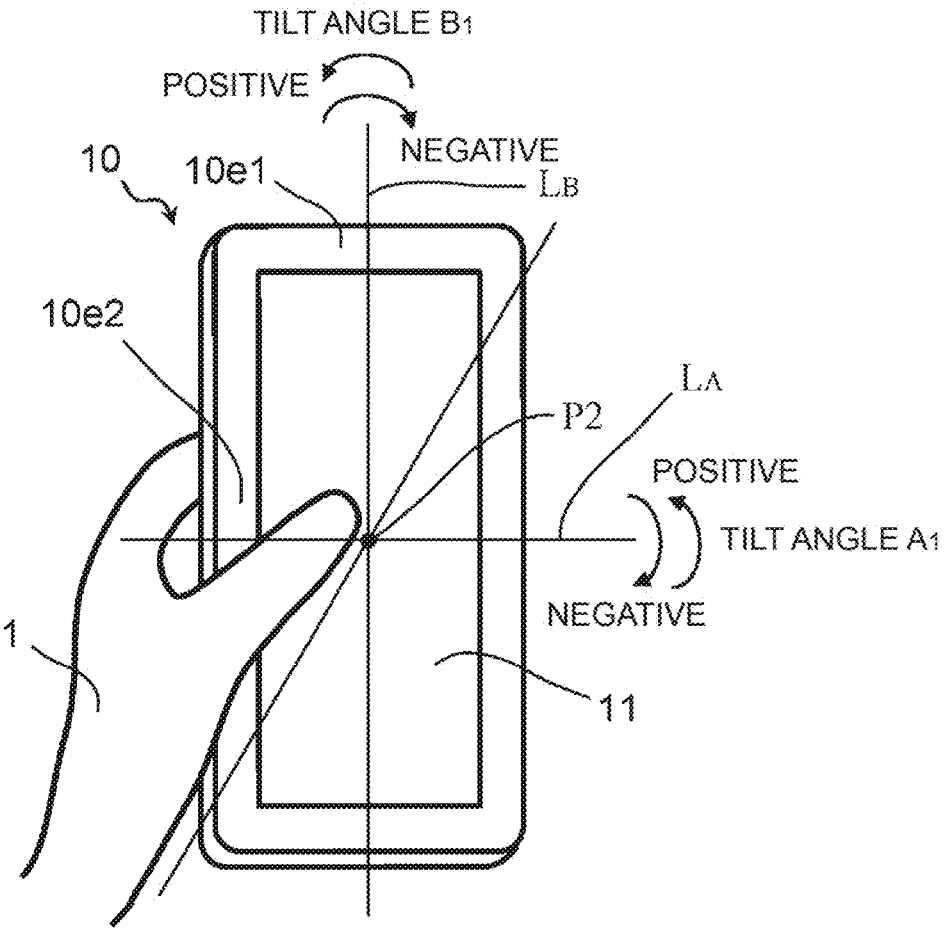
FIG. 3 is a diagram for describing an example of the operation amount information I.

FIG. 3 is a diagram for explaining an example of the operation amount information I. The operation amount information I includes an tilt angle A as an example of the "first operation amount" of each of the terminals 10 and 20 and an tilt angle B as an example of the "second operation amount". Hereinafter, the tilt angles A and B of the terminal 10 are referred to as tilt angles $A_1$ and $B_1$, and the tilt angles A and B of the terminal 20 are referred to as tilt angles $A_2$ and $B_2$. In FIG. 3, the tilt angle $A_1$ and the $B_1$ of the terminal 10 are represented, but the tilt angle $A_2$ and the $B_2$ of the terminal 20 are also represented in the same manner.

In the exemplary embodiment illustrated in FIG. 3, the tilt angle $A_1$ is a rotation angle of the terminal 10 about a rotation axis that is parallel to the center line $L_A$. The center line $L_A$ extends through the center P2 of the terminal 10 and along the lateral direction of the terminal 10. Similarly, the tilt angle $B_1$ is a rotation angle about a rotation axis that is parallel to the center line $L_B$. The center line $L_B$ extends through the center P2 of the terminal 10 and along the length of the terminal 10. The center lines $L_A$ and $L_B$ are orthogonal to each other.

Here, it is assumed that the tilt angle $A_1$ is zero when a predetermined reference state (for example, a state in which the center line $L_B$ is horizontal) is satisfied. Then, the tilt angle $A_1$ becomes positive when the operator 1 tilts the terminal 10 so that the end 10e1 of the terminal 10 farther from the operator 1 with respect to the reference condition is lowered. It is assumed that the tilt angle $A_1$ is negative when the operator 1 tilts the terminal 10 so that the end 10e1 increases with respect to the reference condition. This also applies to the tilt angle $A_2$ of the terminal 20.

Further, it is assumed that the tilt angle $B_1$ is zero when a predetermined reference state (for example, a state in which the center line $L_A$ is horizontal) is satisfied. Then, it is assumed that the tilt angle $B_1$ is positive when the operator 1 tilts the terminal 10 so that the left end 10e2 of the operator 1 is lowered with respect to the reference state, and is negative when the operator 1 tilts the terminal 10 so that the end 10e2 is raised with respect to the reference state. This also applies to the tilt angle $B_2$ of the terminal 20.

Figures 4A, 4B:
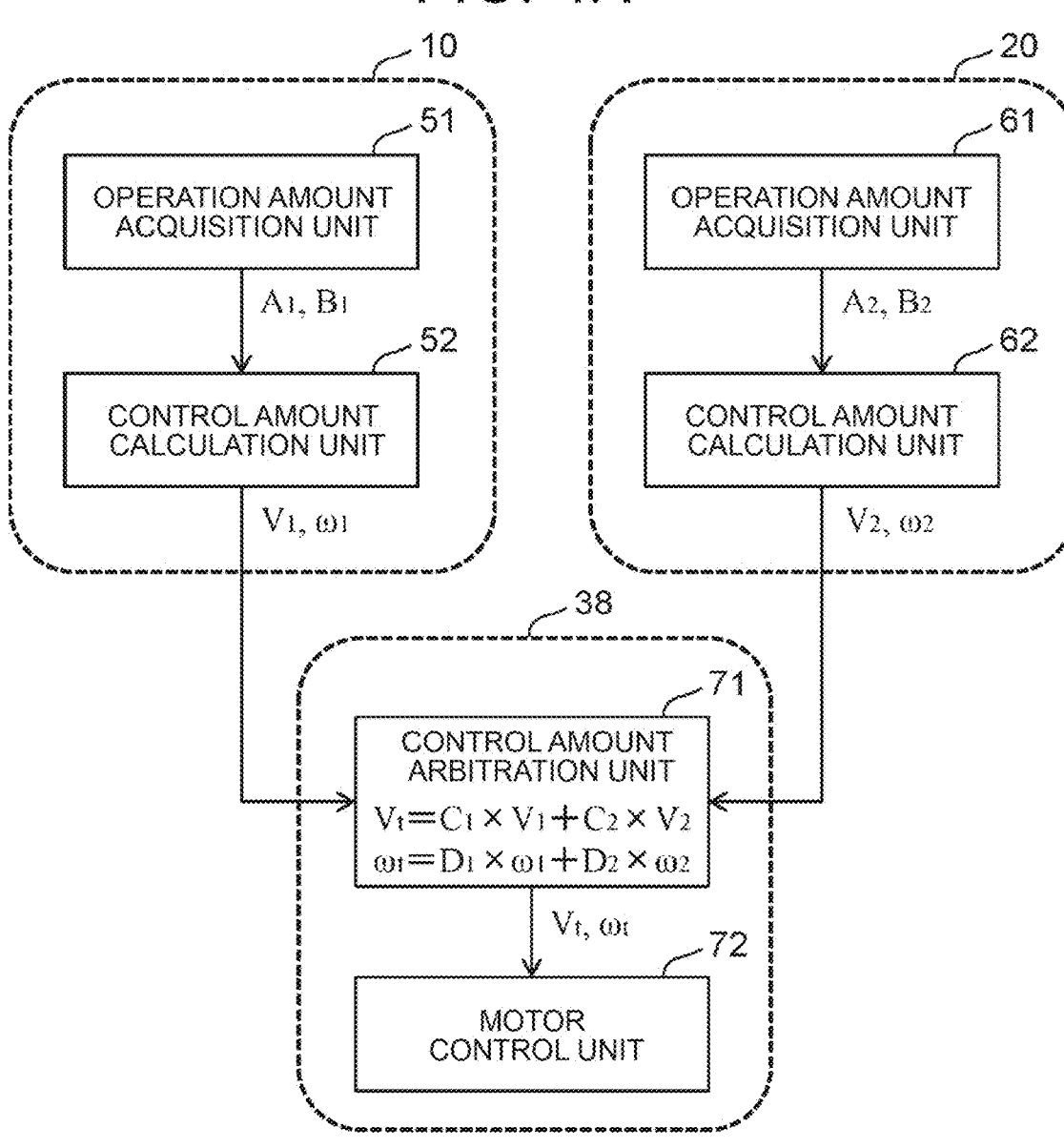
FIG. 4A is a diagram illustrating an example of functional blocks related to travel control of a moving object.
FIG. 4B is a diagram illustrating an example of setting a first ratio and a second ratio.

FIG. 4A is a diagram illustrating an example of functional blocks related to travel control of a mobile object 30. The terminal 10 includes an operation amount acquisition unit 51 and a control amount calculation unit 52 as functional blocks related to travel control of the mobile object 30. Similarly, the terminal 20 includes an operation amount acquisition unit 61 and a control amount calculation unit 62. ECU 38 of the mobile object 30 includes a control amount arbitration unit 71 and a motor control unit 72. These functional blocks are realized by software when the program related to the travel control is executed by the processor 13, 23, or 40.

The operation amount acquisition unit 51 of the terminal 10 acquires the tilt angle $A_1$ and the $B_1$ detected by the tilt angle sensor included in the sensors 15. Similarly, the operation amount acquisition unit 61 of the terminal 20 acquires the tilt angle $A_2$ and the $B_2$ detected by the tilt angle sensor included in the sensors 25. The tilt angle $A_1$, $B_1$, $A_2$, and $B_2$ may, for example, be between −180° and 180°.

The control amount calculation unit 52 of the terminal 10 calculates a target velocity $V_1$ (target control amount). Specifically, the storage device 14 of the terminal 10 stores a of map $MV_1$ that defines the relation between the tilt angle $A_1$ and the target velocity $V_1$. The map $MV_1$ is set such that, for example, when the tilt angle $A_1$ is zero, the target velocity $V_1$ also becomes zero, and the target velocity $V_1$ becomes higher as the positive tilt angle $A_1$ becomes larger. The control amount calculation unit 52 calculates a target velocity $V_1$ corresponding to the acquired tilt angle $A_1$ from the map $MV_1$. In addition, the storage device 24 of the terminal 20 stores a map $MV_2$ that determines the relation between the tilt angle $A_2$ and the target velocity $V_2$ based on the same concept as the map $MV_1$. The control amount calculation unit 62 calculates the target velocity $V_2$ corresponding to the acquired tilt angle $A_2$ from the map $MV_2$.

The control amount calculation unit 52 of the terminal 10 calculates the target turning angular velocity $\omega_1$ (target control amount). Specifically, the storage device 14 also stores a map $M\omega_1$ that defines the relation between the tilt angle $B_1$ and the target turning angular velocity $\omega_1$. The map $M\omega_1$ is set such that the target turning angular velocity $\omega_1$ is also zero when the tilt angle $B_1$ is zero, for example. The map $M\omega_1$ is set such that, for example, the positive target turning angular velocity $\omega_1$ increases as the positive tilt angle $B_1$ increases, and the negative target turning angular velocity $\omega_1$ increases as the negative tilt angle $B_1$ increases. The control amount calculation unit 52 calculates a of the target turning angular velocity $\omega_1$ corresponding to the obtained tilt angle $B_1$ from the map $M\omega_1$. In the storage device 24 of the terminal 20, a map $M\omega_2$ in which the relation between the tilt angle $B_2$ and the target turning angular velocity $\omega_2$ is determined based on the same concept as the map $M\omega_1$ is stored. The control amount calculation unit 62 calculates 2 of the target turning angular velocity $\omega_2$ corresponding to the obtained tilt angle $B_2$ from the map $M\omega_2$.

The target velocity $V_1$ and $V_2$ and the target turning angular velocity $\omega_1$ and $\omega_2$ calculated in the terminals 10 and 20 as described above are transmitted to the mobile object 30.

The control amount arbitration unit 71 of the mobile object 30 arbitrates the target velocities $V_1$ and $V_2$ received from the terminals 10 and 20, respectively. Specifically, the control amount arbitration unit 71 combines the target velocities $V_1$ and $V_2$ calculated for each of the terminals 10 and 20 at the "first ratio" to calculate the final target velocity $V_t$. The final target velocity $V_t$ is expressed, for example, by Equation (3). The first ratio is specified by the coefficients $C_1$ and $C_2$. That is, the $C_1$ is a factor indicating the first ratio of the target velocity $V_1$ and is multiplied by the target velocity $V_1$. The $C_2$ is a factor indicating the first ratio of the target velocity $V_2$ and is multiplied by the target velocity $V_2$. The final target velocity $V_t$ corresponds to the product of the coefficient $C_1$ and the target velocity $V_1$ and the product of the coefficient $C_2$ and the target velocity $V_2$. In an example in which three or more operation terminals are used, three or more target speeds $V_i$ corresponding to three or more first operation amounts are synthesized by the first ratio.

$$V_t = C_1 \times V_1 + C_2 \times V_2 \qquad (3)$$

The control amount arbitration unit 71 arbitrates the target turning angular velocities $\omega_1$ and $\omega_2$ received from the terminals 10 and 20, respectively. Specifically, the control amount arbitration unit 71 combines the target turning angular velocities $\omega_1$ and $\omega_2$ calculated for each of the terminals 10 and 20 at the "second ratio" to calculate the final target turning angular velocity $\omega_t$. The second ratio differs from the first ratio as illustrated in FIG. 4B. The final target turning angular velocity $\omega_t$ is expressed, for example, by Equation (4). The second ratio is specified by the coefficients $D_1$ and $D_2$. That is, the $D_1$ is a factor indicating the second ratio of the target turning angular velocity $\omega_1$ and is multiplied by the target turning angular velocity $\omega_1$. The $D_2$ is a factor indicating the second ratio of the target turning angular velocity $\omega_2$ and is multiplied by the target turning angular velocity $\omega_2$. The final target turning angular velocity $\omega_t$ corresponds to the sum of the product of the coefficient $C_1$ and the target turning angular velocity $\omega_1$ and the product of the coefficient $C_2$ and the target turning angular velocity $\omega_2$. In an example in which three or more operation terminals are used, three or more target turning angular velocities $\omega_i$ corresponding to three or more second operation amounts are combined by a second ratio.

$$\omega_t = D_1 \times \omega_1 + D_2 \times \omega_2 \qquad (4)$$

The first and second ratios can be set by the operator 1 operating the touch panel 11 of the terminal 10. More specifically, for example, the terminal 10 may be able to set only the coefficients $C_1$ and $D_1$ associated with the operation of the terminal 10, or may be able to set the coefficients $C_2$ and $D_2$ associated with the operation of the other terminal 20. This also applies to the terminal 20.

The first and second ratios may be arbitrarily set on condition that they are different from each other. In addition, FIG. 4B shows an exemplary setting of the first and second ratios.

In the embodiment shown in FIG. 4B, the first ratio for the final target velocity $V_t$ is set such that the coefficient $C_1$ of the terminal 10 is greater than the coefficient $C_2$ of the terminal 20. More specifically, for example, the coefficient $C_1$ is set to 1, and the coefficient $C_2$ is set to 0. According to this configuration, only the operator 1 of the terminal 10 can perform an operation of changing the final target velocity Vt. In other words, the final target velocity Vt is determined only by operating the terminal 10.

On the other hand, the second ratio with respect to the final target turning angular velocity $\omega t$ is set such that the coefficient $D_1$ of the terminal 10 is equal to the coefficient $D_2$ of the terminal 20. More specifically, for example, the coefficient $D_1$ is set to 0.5, and the coefficient $D_2$ is set to 0.5. According to this setting example, in order to control the turning angular velocity $\omega$, the two operators 1 and 2 are required to operate the terminals 10 and 20 together with the rhythm.

In addition, in each of the first and second ratios, the sum of the two coefficients (e.g., $C_1+C_2$, $D_1+D_2$) is basically 1 as shown in the example in FIG. 4B. However, the total value may be greater than 1 or less than 1. This also applies to an example in which three or more operation terminals are used and thus three or more coefficients are used.

The motor control unit 72 controls the two electric motors 36L and 36R so that the calculated final target velocity Vt and final target turning angular speed $\omega t$ are realized. More specifically, the motor control unit 72 substitutes the final target velocity Vt and the final target turning angular speed $\omega t$ into the speed V and the turning angular speed $\omega$ in Equations (1) and (2), respectively, to calculate the target velocities $V_L t$ and $V_R t$ of the two drive wheels 34L and 34R, respectively. The motor control unit 72 controls the electric motor 36L and 36R so that the target velocities $V_L t$ and $V_R t$ are realized. Note that the electric motor 36L and 36R correspond to an exemplary "one or more actuators related to traveling of a moving object" according to the present disclosure.

According to the mobile object control system 100 according to the present embodiment described above, the first and second ratios that differ from each other are used in the calculation of the final target velocity Vt and the final target turning angular speed $\omega t$, which are two target values for the travel control of the mobile object 30. Consequently, the ratio in which the first and second manipulated variables of the individual operation terminals 10 and 20 are reflected differs between the final target velocity Vt and the final target turning angular velocity $\omega t$ (see Equations (3) and (4)). This means that the degree of involvement of the two operators 1, 2 with respect to the travel control of the mobile object 30 differs between the final target velocity Vt and the final target turning angular speed $\omega t$. In other words, this allows the two operators 1 and 2 to have different roles in units of the control amount of the mobile object 30, namely, the speed V and the turning angular velocity $\omega$. This leads to the fact that the pleasure of operating the mobile object 30 in cooperation can be easily shared between the two operators 1 and 2.

In addition, the mobile object 30 shown in FIG. 2A is a mobile object suitably used in an entertainment facility such as a theme park or an amusement park, or a sightseeing place. According to the mobile object control system 100 according to the present embodiment, excellent entertainment using the mobile object 30 can be provided to the operators 1 and 2.

Further, as illustrated in FIG. 4B, the first ratio regarding the final target velocity Vt may be set such that the coefficient $C_1$ of the terminal 10 is larger than the coefficient $C_2$ of the terminal 20. The second ratio with respect to the final target turning angular velocity ωt may be set such that the coefficient $D_1$ of the terminal 10 is equal to the coefficient $D_2$ of the terminal 20. Here, it can be said that the control of the speed V related to the progress and the stop of the mobile object 30 is required to have higher safety than the control of the turning angular speed ω of the mobile object 30. According to the configuration example of the first and second ratios, the terminal 10 is dominant in controlling the speed V. Therefore, the operator 1 and the operator 2 can enjoy the cooperative operation while the one operator 1 operating the terminal 10 safely manages the speed V. More specifically, by setting the coefficient $C_1$ to 1 and setting the coefficient $C_2$ to 0, the operator 1 can more reliably stop the mobile object 30 in the unlikely event. With respect to the turning angular velocity ω in which the operations of the operators 1 and 2 are uniformly reflected, the operators 1 and 2 can sufficiently share the enjoyment of the operation of the mobile object 30 by operating the terminals 10 and 20 together with the rhythm.

In addition, according to the above setting example of the first and second ratios, when the mobile object 30 is boarded by the parent and the child, the parent operates the terminal 10 and the child operates the terminal 20. As a result, the child can enjoy the operation related to the turning of the mobile object 30 together with the parent while the parent safely manages the speed V.

3. Another Configuration Example of Mobile Object Control System

Figure 5:
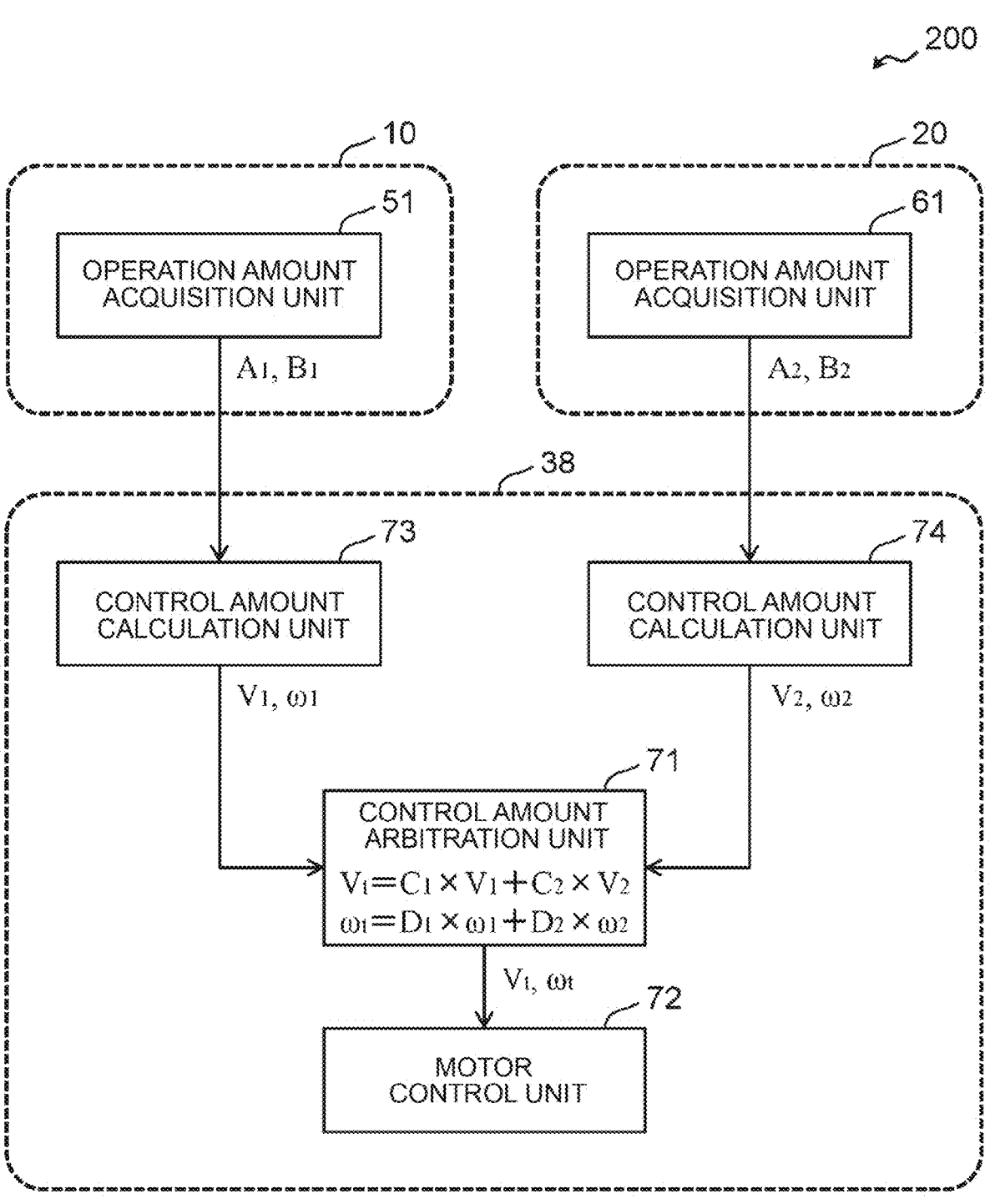
FIG. 5 is a diagram illustrating another exemplary functional block related to travel control of a moving object.
Figure 6:
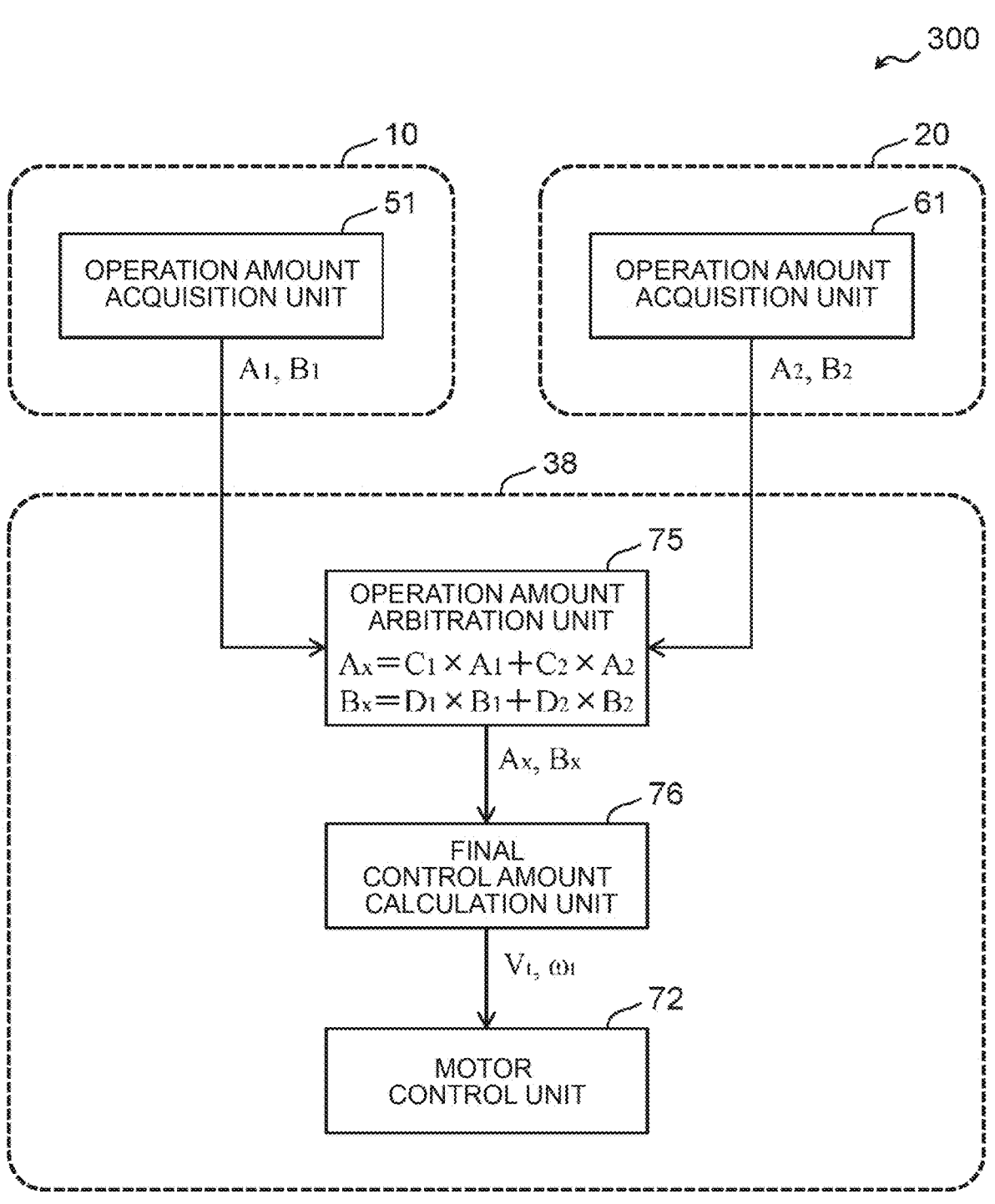
FIG. 6 is a diagram illustrating still another example of a functional block related to travel control of a moving object.

The mobile object control system according to the present disclosure may include the configuration shown in FIG. 5 or FIG. 6 instead of the configuration shown in FIG. 4A and FIG. 4B.

FIG. 5 is a diagram illustrating another example of a functional block related to travel control of the mobile object 30. The mobile object control system 200 illustrated in FIG. 5 is different from the mobile object control system 100 described above in the following points. That is, in the mobile object control system 200, the terminal 10 includes only the operation amount acquisition unit 51, and the terminal 20 includes only the operation amount acquisition unit 61. ECU 38 of the mobile object 30 includes control amount calculation units 73 and 74 in addition to the control amount arbitration unit 71 and the motor control unit 72.

In the example illustrated in FIG. 5, the control amount calculation unit 73 of the mobile object 30 calculates the target velocity $V_1$ corresponding to the tilt angle $A_1$ received from the terminal 10 from the map $MV_1$, and calculates the target turning angular speed @$_1$ corresponding to the tilt angle $B_1$ received from the terminal 10 from the map $Mω_1$. Similarly, the control amount calculation unit 74 calculates the target velocity $V_2$ corresponding to the tilt angle $A_2$ received from the terminal 20 from the map $MV_2$, and calculates the target turning angular speed $ω_2$ corresponding to the tilt angle $B_2$ received from the terminal 20 from the map $Mω_2$. The map $MV_1$, $MV_2$, the $Mω_1$, and the $Mω_2$ are stored in the storage device 34 of ECU 38. The calculated target velocity $V_1$ and $V_2$ and the target turning angular velocity $ω_1$ and $ω_2$ are inputted to the control amount arbitration unit 71.

The mobile object control system 200 described above also provides effects similar to those described above for the mobile object control system 100.

FIG. 6 is a diagram illustrating still another example of a functional block related to the travel control of the mobile object 30. The mobile object control system 300 shown in FIG. 6 is different from the mobile object control system 100 described above in the following points. That is, in the mobile object control system 300, as in the example of the mobile object control system 200, the terminal 10 includes only the operation amount acquisition unit 51, and the terminal 20 includes only the operation amount acquisition unit 61. ECU 38 of the mobile object 30 includes an operation amount arbitration unit 75 and a final control amount calculation unit 76 together with the motor control unit 72.

In the embodiment illustrated in FIG. 6, the operation amount arbitration unit 75 of the mobile object 30 arbitrates the tilt angle $A_1$ and $A_2$ received from the terminals 10 and 20, respectively. Specifically, the operation amount arbitration unit 75 combines the tilt angle $A_1$ and $A_2$ at the "first ratio" to calculate the post-arbitration operation amount (first combination operation amount) $A_x$. The post-arbitration operation amount $A_x$ is expressed, for example, by Equation (5). That is, the post-arbitration operation amount $A_x$ corresponds to the product of the coefficient $C_1$ and the tilt angle $A_1$ and the product of the coefficient $C_2$ and the tilt angle $A_2$. In an example in which three or more operation terminals are used, three or more first operation amounts are synthesized according to a first ratio.

$$A_x = C_1 \times A_1 + C_2 \times A_2 \qquad (5)$$

The operation amount arbitration unit 75 of the mobile object 30 arbitrates the tilt angle $B_1$ and $B_2$ received from the terminals 10 and 20, respectively. Specifically, the operation amount arbitration unit 75 combines the tilt angle $B_1$ and $B_2$ at the "second ratio" to calculate the post-arbitration operation amount (second combination operation amount) $B_x$. The post-arbitration operation amount $B_x$ is expressed, for example, by Equation (6). That is, the post-arbitration operation amount $B_x$ corresponds to the product of the coefficient $D_1$ and the tilt angle $B_1$ and the product of the coefficient $D_2$ and the tilt angle $B_2$. In an example in which three or more operation terminals are used, three or more second operation amounts are combined by a second ratio.

$$B_x = D_1 \times B_1 + D_2 \times B_2 \qquad (6)$$

In addition, even in the example shown in FIG. 6, the first and second ratio coefficient $C_1$, $C_2$, $D_1$, and $D_2$ is set as shown in FIG. 4B as an example.

The final control amount calculation unit 76 calculates the final target velocity $V_t$ corresponding to the post-arbitration operation amount $A_x$ inputted from the operation amount arbitration unit 75 from the map $MV_t$. The map $MV_t$ defines the relation between the post-arbitration operation amount $A_x$ and the final target velocity $V_t$ based on the same concept as the above-described map $MV_1$, and is stored in the storage device 34. Further, the final control amount calculation unit 76 calculates the final target turning angular velocity $ω_t$ corresponding to the post-arbitration operation amount $B_x$ input from the operation amount arbitration unit 75 from the map $Mω_t$. The map $Mω_t$ defines the relation between the post-arbitration operation amount $B_x$ and the final target turning angular velocity $ω_t$ based on the same concept as the map $M\omega_1$ described above, and is stored in the storage device 34. The calculated final target velocity $V_t$ and the final target turning angular speed $\omega_t$ are input to the motor control unit 72.

The mobile object control system 300 described above also provides effects similar to those described above for the mobile object control system 100.

In addition, the configuration shown in FIG. 6 is applicable to a case where the following nonlinear processing is not included in the control amount calculation. On the other hand, the configurations shown in FIG. 4A and FIG. 5 can be applied regardless of whether the nonlinear process is included. Here, the nonlinear processing can be performed by the control amount calculation units 52, 62, 73, and 74. Here, the nonlinear processing will be described by taking the control amount calculation unit 52 as an example. That is, the nonlinear processing in the control amount calculation unit 52 is such that, when the tilt operation O of the terminal 10 is performed while the operator 1 is touching the touch panel 11, the change amount of the tilt angle $A_1$ or $B_1$ by the tilt operation O is used as the first or second operation amount for the control amount calculation.

What is claimed is:

1. A mobile object control system configured to control traveling of a mobile object, the mobile object control system comprising the mobile object including a body, a seating disposed on the body, drive wheels attached to the body, and one or more actuators configured to drive the drive wheels, a first operation terminal and a second operation terminal configured to be held by a first operator and a second operator sitting on the seating, respectively, the first operation terminal and the second operation terminal including sensors, respectively, and a plurality of processors, wherein the plurality of processors is configured to:

acquire a first tilt angle, a second tilt angle, a third tilt angle, and a fourth tilt angle from the sensors, wherein the first tilt angle is a rotation angle of the first operation terminal about a first rotational axis that extends through a center of the first operation terminal and along a lateral direction of the first operation terminal, the second tilt angle is a rotation angle of the first operation terminal along a second rotational axis that extends through the center of the first operation terminal and along a longitudinal direction of the first operation terminal, the third tilt angle is a rotation angle of the second operation terminal along a third rotational axis that extends through a center of the second operation terminal and along a lateral direction of the second operation terminal, and the fourth tilt angle is a rotation angle of the second operation terminal along a fourth rotational axis that extends through the center of the second operation terminal and along a longitudinal direction of the second operation terminal;

calculate a first target speed and a second target speed based on the first tilt angle and the third tilt angle, respectively, the first target speed and the second target speed being target values of a speed in a traveling direction of the mobile object;

calculate a first target turning angular velocity and a second target turning angular velocity based on the second tilt angle and the fourth tilt angle, respectively, the first target turning angular velocity and the second target turning angular velocity being target values of a turning angular velocity of the mobile object;

calculate a final target speed by combining the first target speed and the second target speed using a first ratio;

calculate a final target turning angular velocity by combining the first target turning angular velocity and the second target turning angular velocity using a second ratio different from the first ratio; and control the one or more actuators based on the final target speed and the final target turning angular velocity.

2. The mobile object control system according to claim 1, wherein:

the first ratio includes a first coefficient to be used for multiplication of the first target speed and a second coefficient to be used for multiplication of the second target speed;

the second ratio includes a third coefficient to be used for multiplication of the first target turning angular velocity and a fourth coefficient to be used for multiplication of the second target turning angular velocity;

the first coefficient is larger than the second coefficient; and the third coefficient is equal to the fourth coefficient.

3. The mobile object control system according to claim 2, wherein:

the first coefficient is 1; and the second coefficient is 0.

4. The mobile object control system according to claim 1, wherein:

the plurality of processors includes a first processor, a second processor, and a third processor;

the mobile object further includes the first processor;

the first operation terminal includes the second processor;

the second operation terminal includes the third processor;

the second processor is configured to calculate the first target speed and the first target turning angular velocity;

the third processor is configured to calculate the second target speed and the second target turning angular velocity; and the first processor is configured to calculate the final target speed and the final target turning angular velocity.

5. The mobile object control system according to claim 1, wherein:

each of the first operation terminal and the second operation terminal includes a touch panel; and the first operation terminal is configured such that both the first ratio and the second ratio are designated by the first operator via the touch panel of the first operation terminal.

6. The mobile object control system according to claim 4, wherein:

the first operation terminal further includes a first storage device storing a first map and a second map, the first map defining a relationship between the first tilt angle and the first target speed, and the second map defining a relationship between the second tilt angle and the first target turning angular velocity;

the second operation terminal further includes a second storage device storing a third map and a fourth map, the third map defining a relationship between the third tilt angle and the second target speed, and the fourth map defining a relationship between the fourth tilt angle and the second target turning angular velocity;

the second processor is configured to calculate the first target speed and the first target turning angular velocity based on the first map and the second map; and the third processor is configured to calculate the second target speed and the second target turning angular velocity based on the third map and the fourth map.

7. The mobile object control system according to claim 6, wherein:

the first map indicates that the first target speed increases as the first tilt angle in a positive direction increases;

the second map indicates that the first target turning angular velocity increases as the second tilt angle in a positive direction increases;

the third map indicates that the second target speed increases as the third tilt angle in a positive direction increases; and the fourth map indicates that the second target turning angular velocity increases as the fourth tilt angle in a positive direction increases.

8. The mobile object control system according to claim 1, wherein:

the first rotational axis is perpendicular to the second rotational axis; and the third rotational axis is perpendicular to the fourth rotational axis.

\* \* \* \* \*